United States Patent
Martinez Luque et al.

(10) Patent No.: US 12,320,305 B2
(45) Date of Patent: Jun. 3, 2025

(54) AIRCRAFT TURBOMACHINE

(71) Applicant: SAFRAN AIRCRAFT ENGINES, Paris (FR)

(72) Inventors: Raul Martinez Luque, Moissy-Cramayel (FR); Damien Bernard Emeric Guegan, Moissy-Cramayel (FR); Antoine Claude Baudouin Raoul Marie Secondat De Montesquieu, Moissy-Cramayel (FR); Laurent Soulat, Moissy-Cramayel (FR); Michael Franck Antoine Schvallinger, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/717,361

(22) PCT Filed: Dec. 7, 2022

(86) PCT No.: PCT/FR2022/052264
§ 371 (c)(1),
(2) Date: Jun. 6, 2024

(87) PCT Pub. No.: WO2023/111424
PCT Pub. Date: Jun. 22, 2023

(65) Prior Publication Data
US 2025/0035053 A1 Jan. 30, 2025

(30) Foreign Application Priority Data

Dec. 17, 2021 (FR) ........................................ 2113845

(51) Int. Cl.
*F02C 9/22* (2006.01)
*F01D 17/16* (2006.01)

(52) U.S. Cl.
CPC ................ *F02C 9/22* (2013.01); *F01D 17/16* (2013.01); *F05D 2220/323* (2013.01)

(58) Field of Classification Search
CPC ...... F02C 9/20; F02C 9/22; F02C 3/13; F01D 9/04; F01D 9/041; F01D 17/16;
(Continued)

(56) References Cited

U.S. PATENT DOCUMENTS 4,069,661 A * 1/1978 Rundell .................. F02K 3/075
60/262
5,261,227 A * 11/1993 Giffin, III ............. F01D 17/162
60/226.3

(Continued)

OTHER PUBLICATIONS

International Search Report received for PCT Patent Application No. PCT/FR2022/052264, mailed on Mar. 22, 2023, 5 pages (2 pages of English Translation and 3 pages of Original Document).

*Primary Examiner* — Loren C Edwards
(74) *Attorney, Agent, or Firm* — WOMBLE BOND DICKINSON (US) LLP (57) ABSTRACT

Aircraft turbine engine including two coaxial annular walls defining between them a main annular duct for the flow of a primary airflow; —a rotor blading extending radially through the first duct; —an annular separator arranged downstream of the rotor blading and configured to divide the primary airflow into two to form the secondary air flows; —first variable guide vanes which are distributed around the shaft and each comprise a leading edge which is located upstream of the separator and trailing edges which are located in the secondary airflows; —and fixed guide vanes which are distributed around the shaft in the external airflow and downstream of the first variable vanes.

13 Claims, 5 Drawing Sheets

(58) Field of Classification Search
CPC ........ F01D 17/162; F02K 3/075; F02K 3/077; F05D 2220/323; F05D 2240/12
See application file for complete search history.

(56) References Cited

U.S. PATENT DOCUMENTS

| | | |
|---|---|---|
| 2011/0004388 A1* | 1/2011 | Winter ..................... F02K 3/06 60/226.3 |
| 2011/0171007 A1 | 7/2011 | Johnson et al. |
| 2016/0201608 A1 | 7/2016 | Kupratis |
| 2019/0078536 A1 | 3/2019 | Iwrey |

* cited by examiner

AIRCRAFT TURBOMACHINE

TECHNICAL FIELD OF THE INVENTION

The present invention relates to the general field of the aeronauticore specifically, it is aimed at an aircraft turbomachine.

TECHNICAL BACKGROUND

The previous art includes documents US-A1-2019/078536, US-A1-2016/2014608 and US-A1-2011/171007.

Conventionally, an aircraft turbomachine comprises a gas generator comprising along a longitudinal axis at least one compressor, a combustion chamber, and at least one turbine.

An air flow enters the gas generator and is compressed in the compressor or the compressors. This compressed air flow is mixed with fuel and burned in the combustion chamber and the combustion gases are expanded in the turbine or the turbines. This expansion causes the turbine rotor or rotors to rotate, which drives the compressor rotor or rotors to rotate. The combustion gases are ejected through a nozzle to provide thrust that can be added to a thrust conferred by at least one propeller or propulsion fan of the turbomachine.

Figure 1A:
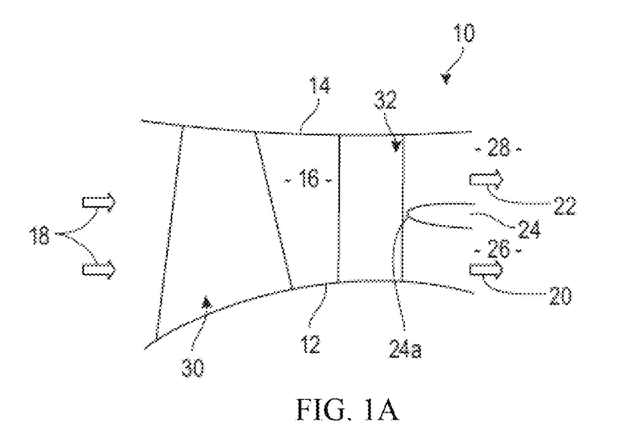
FIG. 1a is a very schematic half-view in axial cross-section of an aircraft turbomachine, according to the prior art to the invention.

The gas flows flow in the turbomachine through annular ducts. As can be seen in FIG. 1a, the turbomachine 10 thus comprises coaxial annular walls, respectively internal 12 and external 14, extending around each other and defining between them a main annular flow duct 16 for a main gas flow 18.

In the case where the main gas flow 18 is to be divided into two secondary gas flows, respectively internal 20 and external 22, an annular separator 24 is arranged between the two walls 12, 14 and defines respectively with these walls 12, 14 two secondary annular flow ducts, respectively internal 26 and external 28, for the secondary gas flows 20, 22. This separator 24 comprises at an upstream end an annular splitter nose 24a configured to split the main gas flow 18 into two and form the secondary gas flows 20, 22.

A rotor blading 30 may extend radially across the main duct 16, thus upstream of the separator 24.

As illustrated in FIG. 1a, structural arms 32 may extend radially across the main duct 16 downstream of the rotor blading 30 and upstream of the separator 24.

Figure 1B:
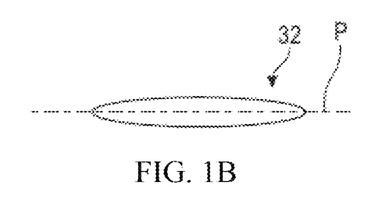

As used in this application, arm 32 or structural arm means a stator element that has a general aerodynamic cross-sectional shape such as that shown in FIG. 1b, but does not comprise intrados or extrados. An arm 32 is not comparable to a vane or blade which is profiled so as to comprise an intrados and an extrados. An arm 32 is generally symmetrical with respect to a plane P passing through the axis of the turbomachine. The number of arms 32 is usually less than 10 and can be 4. At least one of the arms 32 may be hollow and tubular in the radial direction to be passed through by auxiliaries and be used for the passage of these auxiliaries through the ducts in the engine.

Figure 2A:
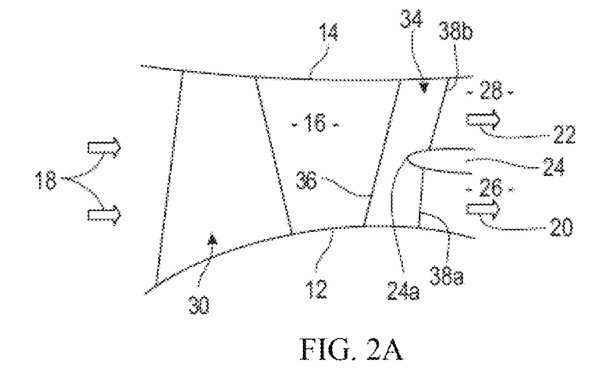
FIG. 2a is a very schematic half view in axial cross-section of an aircraft turbomachine.
Figure 2B:
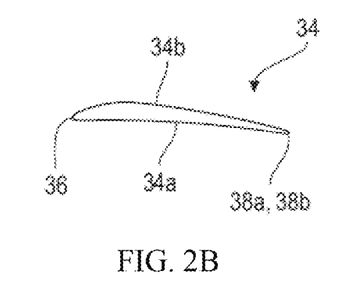

For some types of turbomachine, such as multi-flow or variable cycle, it would be useful to have a stator blading 34 directly downstream of the rotor blading 30 and integrated with the splitter nose 24a for splitting the flows instead of being positioned between the rotor 30 and the separator 24 (see FIG. 2a), so as to reduce the length of the module between the concept shown in FIG. 1a and that shown in FIG. 2a. The stator blading 34 would comprise a plurality of vanes distributed around the axis of the turbomachine. As mentioned above and illustrated in FIG. 2b, each of these vanes would have an aerodynamic profile in cross-section comprising an intrados 34a and an extrados 34b (FIG. 2b), thus a non-symmetrical profile which is not the case of the arm 32 visible in FIG. 1a. The stator blading 34 would extend radially across the main duct 16. These vanes would comprise leading edges 36 located upstream of the splitter nose 24a, in the main duct 16, and trailing edges, respectively internal 38a and external 38b, located in the internal 26 and external 28 ducts. The stator blading could be connected to the splitter nose 24a.

The stator blading 34 would impose a particular direction on the gas flows 16, 20, 22. However, in the case of a variable-cycle turbomachine, it would be useful to provide variable geometry downstream of the rotor blading 30 to be able to adapt to different operation regimes and variations in the bypass ratio of the turbomachine. However, for overall dimension reasons, the adding of a variable pitch blading downstream of the stator blading 34 can be complex. Indeed, this addition would require lengthening the axial dimension of the turbomachine, which would result in an increase in the mass of the turbomachine and a reduction in its performance.

Moreover, for reasons of noise, it would not be possible to move the stator blading 34 axially closer towards the rotor blading 30.

In the present application, a variable-cycle turbomachine means a turbomachine whose specific thrust can be changed at a given engine speed, by controlling variable geometries of the turbomachine. An example of variable geometry is a variable pitch stator blading. In the present application, blading is defined as an annular row of vanes.

The invention thus proposes to optimize a turbomachine as illustrated in FIG. 2a so that it can be used in several configurations and in particular in the context of a multi-flow turbomachine (at least two) and/or a variable cycle turbomachine.

SUMMARY OF THE INVENTION

The present invention proposes an aircraft turbomachine, comprising a gas generator comprising along a longitudinal axis at least one compressor, a combustion chamber and at least one turbine, the turbomachine further comprising:
- two coaxial annular walls, respectively internal and external, extending around each other and defining between them a main annular flow duct for a main air flow,
- a rotor blading extending radially across said main duct,
- an annular separator arranged downstream of the rotor blading and between the two walls, the separator defining with the internal and external walls respectively two secondary annular flow ducts, internal and external respectively, of the secondary air flow, respectively internal and external, the separator comprising at an upstream end an annular splitter nose configured to split the main air flow into two and form the secondary air flows,
stator elements extending radially on the one hand through said main duct and on the other hand through said secondary ducts,
characterised in that said stator elements comprise first variable pitch straightener vanes which are distributed around said axis and which each comprises a leading edge located upstream of said splitter nose, and trailing edges, respectively internal and external, located respectively in the internal and external secondary ducts, and in that the turbomachine further comprises straightener vanes that are at least partly stationary and that are distributed about said axis in the external secondary duct and downstream of the external trailing edges of said first variable pitch vanes.

The present invention thus proposes to provide variable pitch straightener vanes at the level of the splitter nose. In order to allow the angular displacement of these vanes around their pitch axes, it is understood that the vanes will be split by small clearances from the splitter nose and the separator, in order to limit the gas leaks in these areas.

"Stationary" straightener vanes are associated with the variable pitch vanes and are located in the external secondary duct. This configuration allows to optimize the operation of the turbomachine, allowing multi-flow or variable cycle applications, while limiting the impact on the length or axial dimension and the mass of the turbomachine. Indeed, the fact of providing the variable pitch vanes at the level of the splitter nose allows to reduce axially the distance between the rotor and the splitter nose of the flows while allowing a change of the gas flows flowing in the internal and external secondary ducts.

The "stationary" straightener vanes may be completely stationary or may each comprise a stationary portion and a movable portion, in particular with variable pitch. Each of these vanes comprises, for example, an upstream portion with variable pitch comprising a leading edge, and a stationary downstream portion comprising a trailing edge.

In the present application, "annular" means a shape of revolution around an axis, which can be continuous or interrupted.

Furthermore, in the present application, a "variable pitch" element is defined as an element one portion of which has a position that can be adjusted about an axis, which is referred to as the pitch axis. The entirety of this element or only one portion of this element can be with variable pitch. In the case of a vane for example, it can be one-piece and have an adjustable position around a pitch axis. Alternatively, it could comprise only one portion, comprising for example a leading edge or a trailing edge, the position of which would be adjustable around a pitch axis in relation to the rest of the vane. In the case of a blading comprising several vanes, each of the vanes has an adjustable position around its own pitch axis. For the same blading, there are as many pitch axes as there are variable pitch vanes. Each of these axes can have a radial or inclined orientation with respect to the longitudinal axis of the turbomachine.

The turbomachine may comprise one or more of the following characteristics, taken alone or in combination with each other:

- the stator elements further comprise second variable pitch straightener vanes that are located in said internal secondary duct;
- the second variable pitch vanes comprise leading edges and trailing edges, the leading edges of these second variable pitch vanes being located directly downstream of the internal trailing edges of the first variable pitch vanes, and being split by predetermined axial clearances from these trailing edges; the first and second variable pitch vanes are therefore very close together axially so that they are considered as an assembly forming the stator elements within the meaning of the invention; the aforementioned axial clearances between these vanes are preferably as small as possible. The minimization of these axial clearances allows to limit or even prevent the passage of gases during operation between the trailing edges of the first variable pitch vanes and the leading edges of the second variable pitch vanes; it is thus understood that the gases which flow over the intrados of the first variable pitch vanes must then flow over the intrados of the second variable pitch vanes, and that the gases which flow over the extrados of the first variable pitch vanes must then flow over the extrados of the second variable pitch vanes; when the clearances are greater, a portion of the gas flowing over the extrados of the first variable pitch vanes then flows towards the intrados of the second vanes and allows energy to be added to the fluid flowing over the intrados of the first vanes;
- the straightener vanes, which are at least partly stationary, comprise leading edges separated by predetermined axial clearances from the trailing edges of the first variable pitch vanes;
- said clearances are preferably less than 10 mm, more preferably less than or equal to 5 mm;
- the number of said second variable pitch vanes is equal to the number of said first variable pitch vanes; the number of said second variable pitch vanes is equal to a multiple of said first variable pitch vanes;
- the number of said vanes that are at least partly stationary is equal to the number of said first variable pitch vanes;
- the number of said vanes that are at least partly stationary is equal to a multiple of said first variable pitch vanes;
- the turbomachine further comprises at least one system for controlling the angular pitch of the variable pitch vanes;
- said control system is mounted within said separator or radially outside said external wall;
- at least some of said vanes, which are at least partly stationary, have different profiles from those other vanes, and thus form a multi-profile vane grid;
- the rotor blading is a propulsion fan or a compressor rotor blading; and
- straightener vanes that are at least partly stationary are fully stationary;
- the straightener vanes, which are at least partly stationary, each comprise a stationary portion and a movable portion, in particular with variable pitch; each of these vanes comprises, for example, an upstream portion with variable pitch comprising a leading edge, and a stationary downstream portion comprising a trailing edge;
- said straightener vanes that are at least partly stationary comprise an intrados and an extrados, and said variable pitch straightener vanes comprise an intrados and an extrados.

The present invention also relates to an aircraft, in particular a transport plane, comprising a turbomachine as described above.

BRIEF DESCRIPTION OF THE FIGURES

Further characteristics and advantages of the invention will become apparent from the following detailed description, for the understanding of which reference is made to the attached drawings in which:

FIG. 1b is a very schematic view in cross-section of an arm of the turbomachine of FIG. 1a;

FIG. 2b is a very schematic view in cross-section of a stator vane of the turbomachine of FIG. 2a;

DETAILED DESCRIPTION OF THE INVENTION

FIGS. 1a, 1b, 2a and 2b have been described in the above.

Figure 3A:
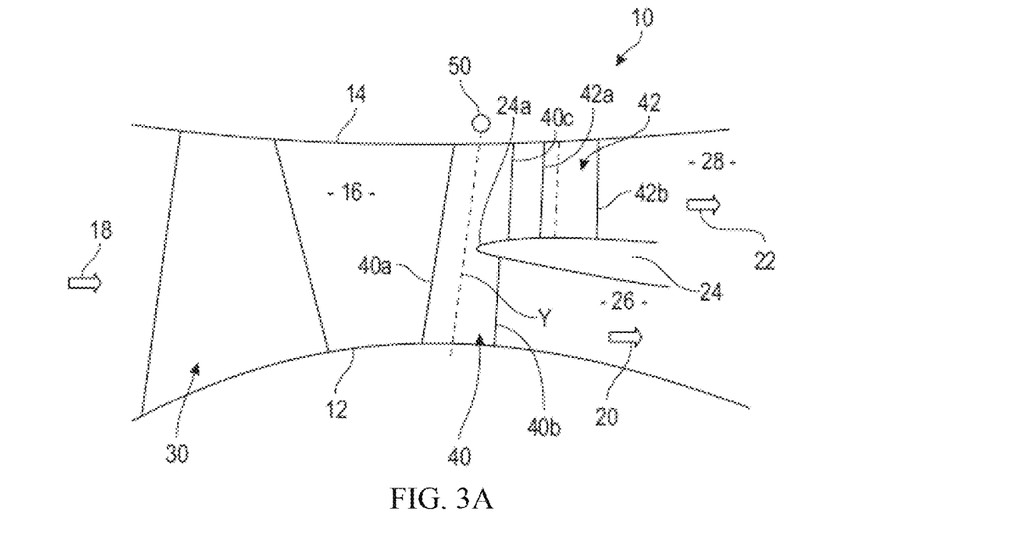
FIG. 3a is a very schematic half-view in axial cross-section of an aircraft turbomachine, according to a first embodiment of the invention.
Figure 3B:
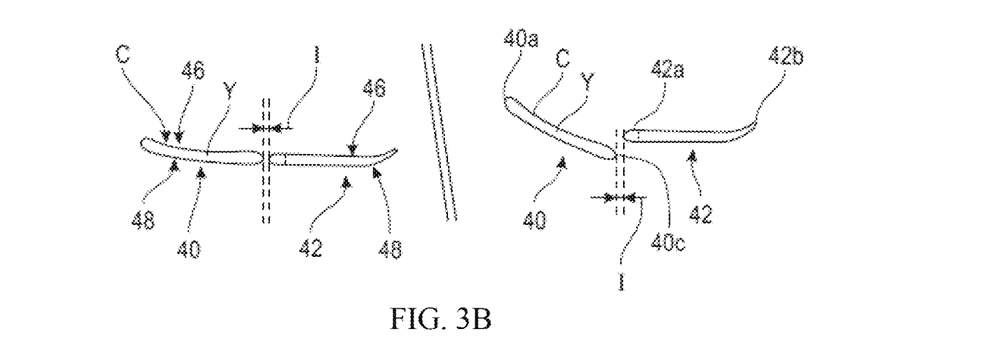
FIG. 3b is a very schematic cross-sectional view of a variable pitch straightener vane followed by a stationary straightener vane of the turbomachine of FIG. 3a, and illustrates, respectively on the left and on the right of the figure, two distinct pitch positions of the variable pitch straightener vane.
Figure 3C:
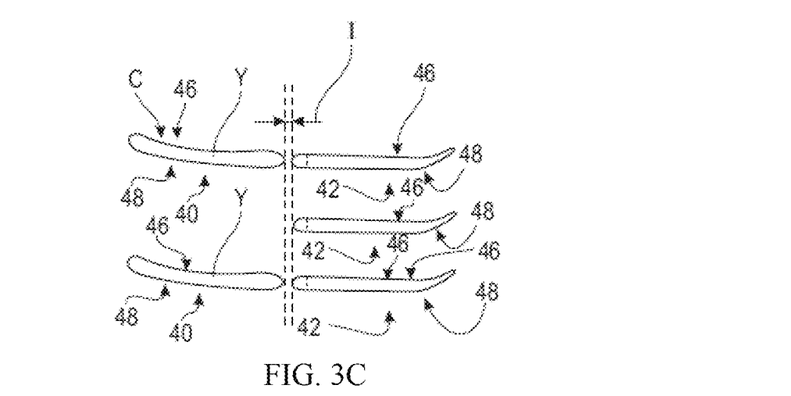
FIG. 3c is a view similar to that of FIG. 3b on the left, and shows a variant embodiment of the invention.

FIGS. 3a and 3b illustrate a first embodiment of the invention.

In a conventional manner, the turbomachine 10 comprises a gas generator (not shown) comprising along a longitudinal axis at least one compressor, a combustion chamber and at least one turbine, the turbomachine.

The turbomachine 10 comprises two coaxial annular walls, respectively internal 12 and external 14, extending around each other and defining between them a main annular flow duct 16 for a main gas flow 18.

The main gas flow 18 is divided into two secondary gas flows, respectively internal 20 and external 22, by an annular separator 24 which is arranged between the two walls 12, 14. This separator 24 comprises at an upstream end an annular splitter nose 24a configured to split the main gas flow 18 into two and form the secondary gas flows 20, 22.

A rotor blading 30 extends radially across the main duct 16, upstream of the separator 24.

Stator elements are located downstream of the rotor blading 30 and at the level of the splitter nose 24a.

According to the invention, these stator elements comprise first variable pitch straightener vanes 40.

In addition, "stationary" straightener vanes 42 are located in the external secondary duct 28 downstream of the first variable pitch straightener vanes 40.

The first variable pitch vanes 40 are distributed around the axis and each comprise a leading edge 40a located upstream of the splitter nose 24a, and trailing edges, respectively internal 40b and external 40c, located respectively in the internal 26 and external 28 secondary ducts. It is thus understood that the first variable pitch vanes 40 are located at the level of the splitter nose 24a, as seen in the drawing. Non-visible clearances are provided between the splitter nose 24a and the first variable pitch vanes 40 to allow their displacement. These clearances are preferably as small as possible to limit or prevent the passage of gas between these vanes 40 and the nose 24a. As is also visible, the leading edges 42a may be inclined and extend outwardly from upstream to downstream. This inclination is for example determined according to a compromise between the size of the engine and the optimization of the noise it generates. To minimize noise, it is best to increase the height at the top of the blade, which results in a higher inclination of the blade.

FIG. 3b shows that each of the first variable pitch vanes 40 has an aerodynamic profile and comprises an intrados 46 (concave curved shape) and an extrados 48 (convex curved shape). In addition, each of the first variable pitch vanes has some curvature along its chord. C is designated as the area of greatest curvature of a variable pitch vane 40. This area is preferably located upstream of the splitter nose 24a.

The first variable pitch vanes 40 are preferably all identical. Their leading edges 40a are preferably passed through by a same transverse plane.

The number of the first variable pitch vanes 40 is for example between 10 and 200.

Each of the first variable pitch vanes 40 is rotatable about a pitch axis Y that has a substantially radial orientation. The rotation of each of the first variable pitch vanes 40 is obtained by a control system 50, which is located here radially outward of the external wall 14. This is advantageous because it allows this system to be located in a relatively cool environment compared to the high temperatures that can occur in the gas generator. Moreover, this environment is not very constrained and contains free spaces to accommodate this type of system.

The stationary vanes 42 are distributed around the axis in the external secondary duct 28. They each comprise a leading edge 42a located downstream of the splitter nose 24a, and a trailing edge 42b located in the external secondary duct 28.

FIG. 3b shows that each of the stationary vanes 42 has an aerodynamic profile and comprises an intrados 46 (concave curved shape) and an extrados 48 (convex curved shape). In addition, each of the stationary vanes 42 has a certain curvature along its chord.

The stationary vanes 42 can be completely stationary or can each comprise a stationary portion and a movable portion and in particular with variable pitch. Each of these vanes 42 comprises, for example, an upstream portion with variable pitch with the leading edge 42a, and a stationary downstream portion with the trailing edge 42b. These portions are schematically delimited by dotted lines in the figures.

The number of stationary vanes 42 is equal to the number of first variable pitch vanes 40 or a multiple number of the first variable pitch vanes 40, and the stationary vanes 42 are located directly downstream of and in axial extension of the first variable pitch vanes 40. The leading edges 42a of the stationary vanes 42 are split by predetermined axial clearances I from the trailing edges 40c of the first variable pitch vanes 40. Preferably, these clearances I are less than 10 mm and more preferably less than or equal to 5 mm. Preferably, these clearances I are less than 10% of the chord of a vane 40 or a vane 42, and more preferably less than or equal to 5% of this chord. Each of these clearances I is preferably constant over the entire radial extent of the edges 40c, 42a concerned and thus of the external duct 28. Naturally, these clearances I are likely to vary during operation according to the pitch positions of the vanes 40 in relation to the vanes 42.

The stationary vanes 42 are preferably all identical. Their leading edges 42a are preferably in the same transverse plane or passed through by a same transverse plane.

The number of stationary vanes 42 is for example between 10 and 200.

FIG. 3b shows on the left a first angular or pitch position of the first variable pitch vanes 40 and on the right a second angular or pitch position of these vanes. For example, the first variable pitch vanes 40 can be displaced over angular ranges of the order of 60° about their axes Y.

Figure 4A:
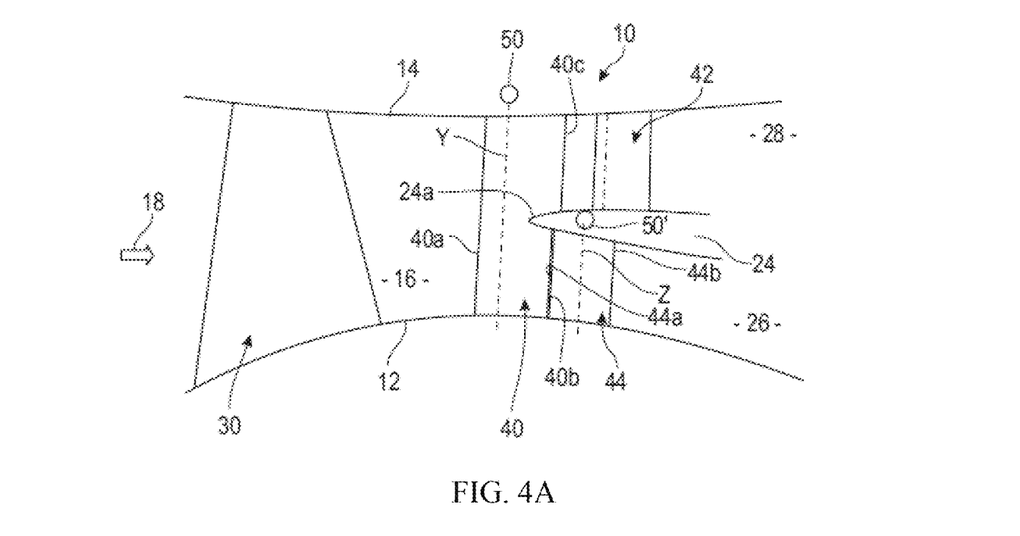
FIG. 4a is a very schematic half-view in axial cross-section of an aircraft turbomachine, according to a second embodiment of the invention.
Figure 4B:
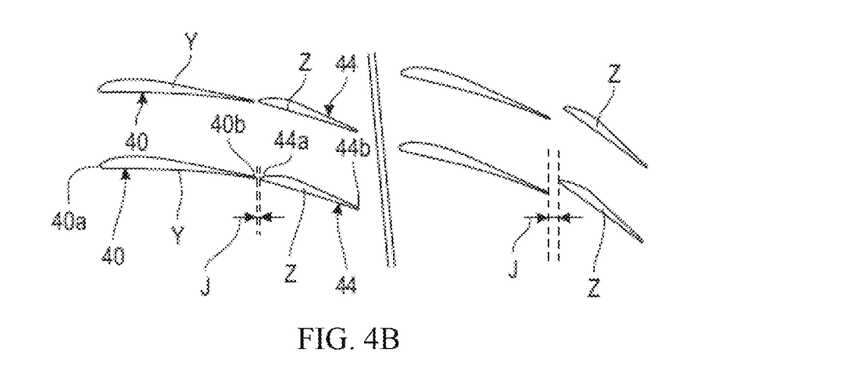
FIG. 4b is a very schematic cross-sectional view of a first variable pitch straightener vane followed by a second variable pitch straightener vane of the turbomachine of FIG. 4a, and illustrates, respectively on the left and on the right of the figure, two distinct pitch positions of these vanes.
Figure 4C:
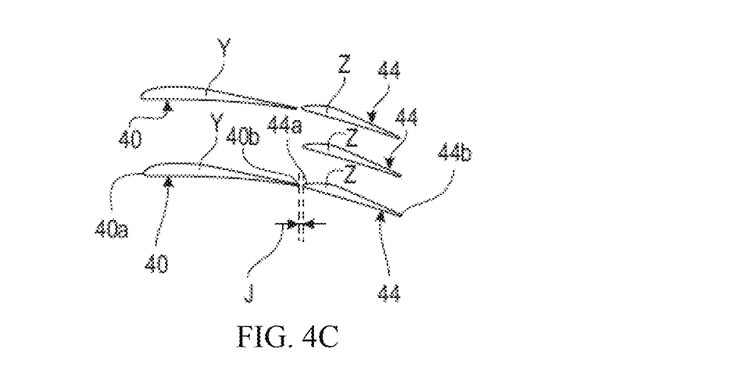
FIG. 4c is a view similar to that of FIG. 4b on the left, and shows a variant embodiment of the invention.

FIG. 4c illustrates an alternative embodiment in which the number of stationary vanes 424 is equal to a multiple of the number of first variable pitch vanes 40. This multiple is for example 2, 3, 4, etc.

FIGS. 4a and 4b illustrate a second embodiment of the invention that differs from the previous embodiment essentially in that the turbomachine further comprises second variable pitch straightener vanes 44 located in the internal secondary duct 26 downstream of the trailing edges 40b of the first variable pitch vanes 40.

The second variable pitch vanes 44 each comprise a leading edge 44a located downstream of the splitter nose 24a, and a trailing edge 44b located in the internal secondary duct 26.

Each of the second variable pitch vanes 44 has an aerodynamic profile and comprises an intrados and an extrados. In addition, each of the variable pitch vanes 44 has some curvature along its chord.

The number of second variable pitch vanes 44 may be equal to the number of first variable pitch vanes 40.

The second variable pitch vanes 44 are located directly downstream of the stationary vanes 42 and in the axial extension of them. The leading edges 44a of the second variable pitch vanes 44 are separated by predetermined axial clearances J from the trailing edges 42c of the stationary vanes 42. Preferably, these clearances J are less than 10 mm and more preferably less than or equal to 5 mm. Preferably, these clearances J are less than 10% of the chord of a vane 40 or a vane 44, and more preferably less than or equal to 5% of this chord. Each of these clearances J is preferably constant over the entire radial extent of the relevant edges 40b, 44a and thus of the internal duct 26. Naturally, these clearances J are likely to vary during operation according to the pitch positions of the vanes 40, 44.

The second variable pitch vanes 44 are preferably all identical. Their leading edges 44a are preferably located in a same transverse plane or passed through by a same transverse plane.

The number of the second variable pitch vanes 44 is for example between 10 and 200. Each of the second variable pitch vanes 44 is rotatable about a pitch axis Z that has a substantially radial orientation. The rotation of each of the second variable pitch vanes 44 is achieved by a control system 50' which is located here in the separator 24.

FIG. 4c illustrates an alternative embodiment in which the number of variable pitch straightener vanes 44 is equal to a multiple of the number of first variable pitch vanes 40. This multiple is for example 2, 3, 4, etc.

Figure 5:
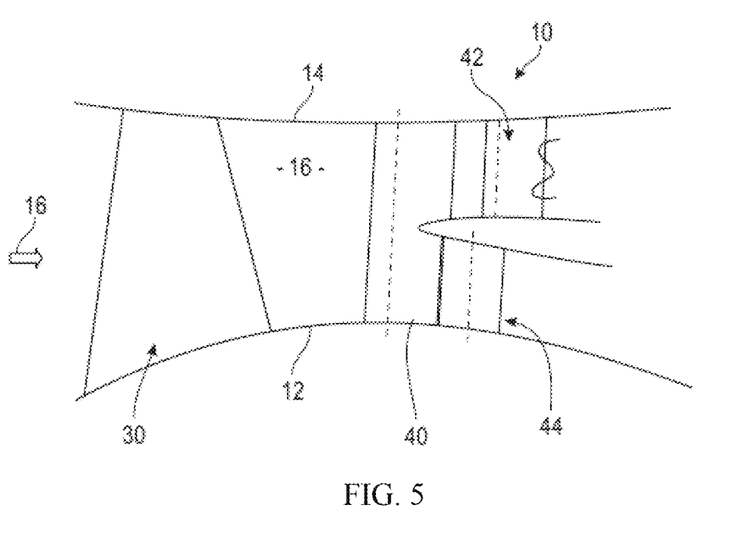
FIG. 5 is a very schematic half-view in axial cross-section of an aircraft turbomachine, according to a third embodiment of the invention in which the stator grid is composed of at least two different vane profiles.

FIG. 5 illustrates a third embodiment of the invention which differs from the previous embodiment primarily in that the stationary vanes 42 are not all identical. The stationary vanes 42 are of at least two types that differ from each other in size and/or geometry and/or camber, etc. The different types of stationary vanes 42 are evenly distributed around the axis so as to obtain a cyclic distribution of these vanes 42 around the axis.

In general, the present invention applies to any turbomachine in which a main flow is split into two secondary flows downstream of a shrouded rotor blading.

The invention claimed is:

1. An aircraft turbomachine, comprising
a gas generator comprising along a longitudinal axis at least one compressor, a combustion chamber and at least one turbine,
two coaxial annular walls, including an internal wall and an external wall, the internal wall and the external wall extending around each other and defining therebetween a main annular flow duct for a main air flow,
a rotor blading extending radially across said first main annular flow duct,
an annular separator arranged downstream of the rotor blading and between the internal wall and the external wall, the separator defining, with the internal wall and the external wall respectively, two secondary annular flow ducts including an internal secondary annular flow duct and an external secondary annular flow duct, the internal secondary annular flow duct for an internal secondary air flow and the external secondary annular flow duct for an external secondary air flow, the separator comprising, at an upstream end, an annular splitter nose configured to split the main air flow to form the internal secondary air flow and the external secondary air flow, and
stator elements extending radially through each of the main annular flow duct, the internal secondary annular flow duct, and the external secondary annular flow duct,
wherein said stator elements comprise first variable pitch straightener vanes, the first variable pitch straightener vanes are distributed around said axis, the first variable pitch straightener vanes each comprise a leading edge located upstream of said splitter nose, an internal trailing edge located in the internal secondary annular flow duct, and an external trailing edge located in the external secondary annular flow duct, and
the turbomachine further comprises secondary straightener vanes that are distributed about said axis in the external secondary annular flow duct and downstream of the external trailing edges of said first variable pitch straightener vanes, each of the secondary straightener vanes comprising a stationary portion and a movable portion with a variable pitch.

2. The turbomachine according to claim 1, wherein the stator elements further comprise second variable pitch straightener vanes that are located in said internal secondary annular flow duct.

3. The turbomachine according to claim 2, wherein the second variable pitch straightener vanes comprise leading edges and trailing edges, the leading edges of the second variable pitch straightener vanes being located directly downstream of the internal trailing edges of the first variable pitch straightener vanes, and being separated by predetermined axial clearances (J) from said trailing edges of the first variable pitch straightener vanes.

4. The turbomachine according to claim 3, wherein said predetermined axial clearances are less than 10 mm.

5. The turbomachine according to claim 2, wherein a total number of said second variable pitch straightener vanes is equal to A) a total number of said first variable pitch straightener vanes or, B) a multiple of the total number of said first variable pitch straightener vanes.

6. The turbomachine according to claim 1, wherein the secondary straightener vanes that are at least partly stationary comprise leading edges separated by a predetermined axial clearances (I) from said trailing edges of the first variable pitch straightener vanes.

7. The turbomachine according to claim 1, wherein a total number of said secondary straightener vanes that are at least partly stationary is equal to A) a total number of said first variable pitch straightener vanes or, B) a multiple of the total number of said first variable pitch straightener vanes.

8. The turbomachine according to claim 1, wherein the turbomachine further comprises at least one control system for controlling an angular pitch of the variable pitch straightener vanes.

9. The turbomachine according to claim 8, wherein said control system is mounted within said separator or radially outside said external wall.

10. The turbomachine according to claim 1, wherein at least some of said secondary straightener vanes that are at least partly stationary, have different profiles from vanes of the first variable pitch straightener vanes.

11. The turbomachine according to claim 1, wherein the rotor blading is a fan or a compressor rotor blading.

12. The turbomachine according to claim 1, wherein each of the secondary straightener vanes comprises an upstream portion with variable pitch including a leading edge, and a stationary downstream portion comprising a trailing edge.

13. The turbomachine according to claim 1, wherein said secondary straightener vanes that are at least partly stationary comprise an intrados and an extrados, and said first variable pitch straightener vanes comprise an intrados and an extrados.

* * * * *